(12) United States Patent
Liu et al.

(10) Patent No.: US 8,825,420 B1
(45) Date of Patent: Sep. 2, 2014

(54) METHOD AND SYSTEM FOR CALCULATING TIMING VARIATIONS CONSIDERING SIMULTANEOUS SWITCHING NOISE

(75) Inventors: Geping Liu, Sunnyvale, CA (US); Kundan Chand, Cupertino, CA (US); Zhe Li, Sunnyvale, CA (US); Wui Hung Moo, Perak (MY); Joseph Boon Hock Kho, Sarawak (MY)

(73) Assignee: Altera Corporation, San Jose, CA (US)

( * ) Notice: Subject to any disclaimer, the term of this patent is extended or adjusted under 35 U.S.C. 154(b) by 920 days.

(21) Appl. No.: 12/690,047

(22) Filed: Jan. 19, 2010

(51) Int. Cl.
*G01R 13/00* (2006.01)

(52) U.S. Cl.
USPC .......................................................... 702/69

(58) Field of Classification Search
USPC ..................... 702/69; 716/115, 116; 126/69
See application file for complete search history.

(56) References Cited

U.S. PATENT DOCUMENTS 8,001,508 B1 * 8/2011 Daud et al. .................... 716/115
8,214,781 B1 * 7/2012 Liu et al. ....................... 716/106

* cited by examiner

*Primary Examiner* — Aditya Bhat
(74) *Attorney, Agent, or Firm* — Womble, Carlyle, Sandridge & Rice LLP

(57) ABSTRACT

A computer implemented method for determining a timing variation for an edge of a waveform under simultaneous switching noise (SSN) conditions is provided. The method includes characterizing an impact of mutual inductive relationships on a pin while the pin is at a quiet state and characterizing a signal edge applied to the pin. The signal edge can be characterized by the slew rate in one embodiment. A voltage change related to a curve characterizing the impact of mutual inductive relationships is identified and the voltage change is applied to a curve characterizing an impact of SSN on the signal edge. The method includes calculating a timing variation correlated to the voltage change applied to the curve characterizing the impact of SSN on the signal edge and presenting the calculated timing variation.

21 Claims, 8 Drawing Sheets

METHOD AND SYSTEM FOR CALCULATING TIMING VARIATIONS CONSIDERING SIMULTANEOUS SWITCHING NOISE

BACKGROUND

Simultaneous switching noise (SSN) in an integrated circuit (IC) and the IC package may be attributed to two primary factors: the mutual inductive coupling among switching input/output (I/O) buffers and the impedance profile of a power distribution network (PDN). In essence, reducing SSN is a design-cost issue. While designers can minimize the mutual inductive coupling by increasing the ratio of ground pins (or return-current pins) to I/O buffers, this approach sacrifices I/O buffer densities. Engineers can improve PDN performance by increasing on-die capacitance and adding on-package decoupling capacitors, but this approach increases costs.

Furthermore, due to the programmable nature of programmable logic devices (PLD), they fit into a wide variety of user applications, and it is useful for designers to have a tool to determine their own SSN budget without additional costs. Ideally, this kind of tool requires instantaneous and accurate result predictions for various I/O buffer assignments and ideally would provide an optimum buffer assignment under certain design constraints. In the past, designers have constructed system-level, "SPICE-like" models to anticipate SSN in PLD systems. These models are based on an understanding of SSN cause mechanisms and correlate well with bench measurements, helping IC and packaging designers improve designs.

However, these models are so complicated that they require signal/power integrity expertise to perform time-consuming, system-level simulations. It is cumbersome for all designers to perform the same level SSN analysis without considering their different design margins. Therefore, there is a need for a tool to help users execute a comprehensive SSN analysis in a short design cycle, though the invention claimed below has applicability to other applications beyond this particular application, as will become apparent from the following description and the drawings.

It is within this context that the invention arises.

SUMMARY

Broadly speaking, the present invention fills these needs by providing a method and system for determining a timing variation for a transitioning waveform while considering simultaneous switching noise (SSN) conditions in accordance with one embodiment. It should be appreciated that the present invention can be implemented in numerous ways, including as a method, a system, or an apparatus. Several inventive embodiments of the present invention are described below.

In one aspect of the invention, a method for determining a timing variation for a transitioning waveform at a phase relationship between signals of a victim pin and an aggressor pin is provided. The method includes calculating an amplitude value for a SSN condition at a phase offset that corresponds to the phase relationship. In one embodiment, the amplitude value is related to one of inductive crosstalk or noise on a pre driver power distribution network. The method also includes adjusting the amplitude value with a pre-calculated constant. In one embodiment the pre-calculated constant is derived from physical measurements. The adjusted amplitude value is combined with an impact from additional aggressor pins within a bank of pins having the aggressor pin to determine the timing variation and the timing variation for the edge of the transitioning waveform is presented.

In another aspect of the invention, a computer implemented method for determining a timing variation for an edge of a waveform under simultaneous switching noise (SSN) conditions. The method includes characterizing an impact of mutual inductive relationships on a pin while the pin is at a quiet state and characterizing a signal edge applied to the pin. The signal edge can be characterized by the slew rate in one embodiment. A voltage change related to a curve characterizing the impact of mutual inductive relationships is identified and the voltage change is applied to a curve characterizing an impact of SSN on the signal edge. The method includes calculating a timing variation correlated to the voltage change applied to the curve characterizing the impact of SSN on the signal edge and presenting the calculated timing variation.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for characterization of simultaneous switching noise (SSN) for an integrated circuit so that the timing variations due to SSN conditions are determined. It will be obvious, however, to one skilled in the art, that the present invention may be practiced without some or all of these specific details. In other instances, well known process operations have not been described in detail in order not to unnecessarily obscure the present invention.

The embodiments described below provide an accurate timing analysis based on Input/Output (I/O) SSN mechanisms such as, cross talk, power distribution network (PDN) noise, resonance, reflection, loading terminations, etc. The relatively quick analysis is provided as the methodology described herein breaks down and analyzes the various problems in small blocks. Thus, the embodiments provide an accurate solution in a computationally efficient manner. The techniques described herein provide voltage amplitude information as well as timing information. In one embodiment, the impact of SSN on the timing margin for signals is accurately predicted through the algorithm described herein. The algorithm is enabled due to a linear relationship between I/O timing variations at SSN conditions and SSN amplitude. As illustrated below, the push-out or pull-in is determined through inductive cross talk and power distribution network noise of output drivers and pre-drivers. Furthermore, the embodiments described herein may be integrated with other SSN tools owned by the assignee as described in U.S. application Ser. Nos. 12/034,400, 12/137,407, 12/208,190, and 11/877,072, each of which are incorporated herein by reference for all purposes.

Figure 1:
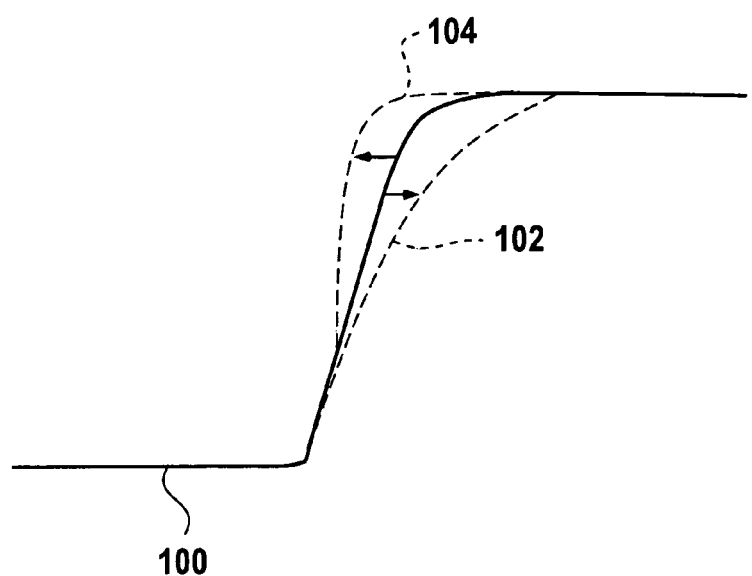
FIG. 1 is a simplified schematic diagram illustrating the timing variation of a victim page waveform transition at a SSN condition in accordance with one embodiment of the invention.

FIG. 1 is a simplified schematic diagram illustrating the timing variation of a victim page waveform transition at a SSN condition in accordance with one embodiment of the invention. The waveform 100 is illustrated with a push out timing effect through curve 102 and a pull in timing effect through curve 104. One skilled in the art will appreciate that multiple input/output (I/O) pins may toggle at the same time, to bring the simultaneous switching noise effects to a victim pin. When the victim pin has a signal edge transition, this edge can be shifted later or earlier in time as compared to that at a quiet condition. The quiet condition for the victim pin is illustrated by waveform 100. The timing variation may be defined as the time difference of the victim edge reaching the same voltage level at both quiet and SSN conditions in one embodiment. A positive timing variation occurs when a victim edge is pushed out later, i.e., a push out effect, then that at a quiet condition. The timing variation is negative when the victim edge is pulled in earlier, i.e., a pull in affect.

Figure 2A:
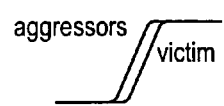
FIGS. 2A through 2D represent four types of phase relationships between aggressor pins and a victim pin for an SSN condition, in accordance with one embodiment of the invention.
Figure 2B:
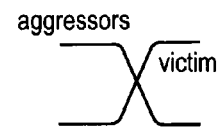
Figure 2C:
Figure 2D:
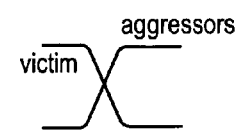

FIGS. 2A through 2D represent four types of phase relationships between aggressor pins and a victim pin for an SSN condition, in accordance with one embodiment of the invention. In FIG. 2A all aggressors and the victim pin have in-phase rising edges. In FIG. 2B all aggressors have falling edges simultaneously, while the victim pin has an out of phase (180° phase offset) rising edge. In FIG. 2C all aggressor pins and the victim pin have in-phase falling edges simultaneously. In FIG. 2D, all aggressor pins have rising edges simultaneously, while the victim pin has an out of phase falling edge. It should be appreciated that the exemplary phase relationships illustrated in FIGS. 2A through 2D are not meant to be limiting.

One skilled in the art will appreciate that I/O timing variations at SSN conditions are primarily caused by the inductive cross talk and Delta-I noises of the driver power distribution network and the pre-driver power distribution network (PDN). The timing effect of inductive cross talk is based upon phase relationships between aggressor and victim edges, while $V_{CCIO}$ and $V_{CCPD}$ PDN noises always delay the victim edge. In one embodiment, these contributions can be differentiated and quantified by adjusting the phase offset between aggressor and victim edges.

Figure 3:
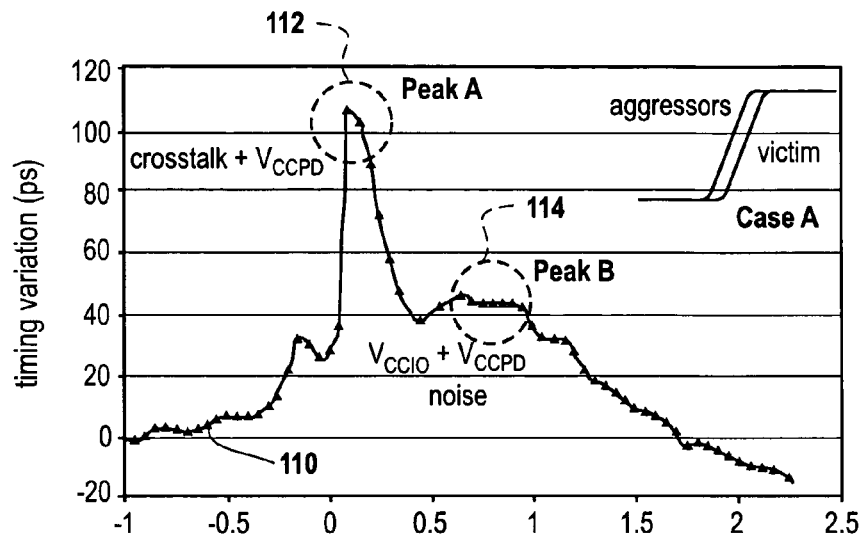
FIG. 3 is a simplified schematic diagram illustrating the timing variation at different phase offsets for the phase relationship of FIG. 2A in accordance with one embodiment of the invention.

FIG. 3 is a simplified schematic diagram illustrating the timing variation at different phase offsets for the phase relationship of FIG. 2A in accordance with one embodiment of the invention. Line 110 illustrates the various timing variations in pico seconds versus the phase offset. Peak A in region 112 represents the worst timing push out, which is caused by inductive crosstalk and $V_{CCPD}$ PDN noise. Peak B in region 114 is due to $V_{CCIO}$ and $V_{CCPD}$ PDN noise. It should be appreciated that since the aggressor pins and the victim pin have in-phase transition from a logical low to a logical high level in the exemplary representation of FIG. 2A, the inductive crosstalk delays the rising edge of the victim pin. That is, the timing variation is greater than zero as the victim edge is pulled in.

Figure 4:
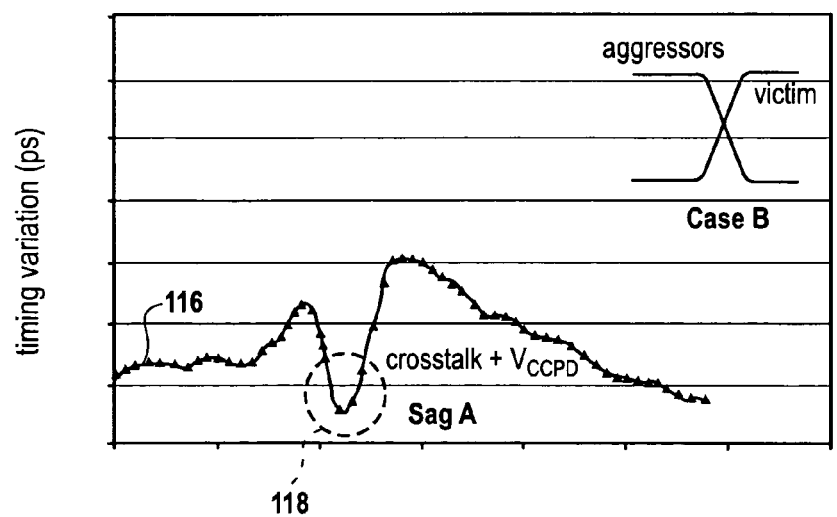
FIG. 4 is a simplified schematic diagram illustrating the timing variation at different phase offsets for the phase relationship of FIG. 2B in accordance with one embodiment of the invention.

FIG. 4 is a simplified schematic diagram illustrating the timing variation at different phase offsets for the phase relationship of FIG. 2B in accordance with one embodiment of the invention. Line 116 illustrates the various timing variations in pico seconds versus the phase offset. Sag A in region 118 pulls in the victim rising edge, while $V_{CCPD}$ PDN noise pushes out the edge in an opposite direction. Eventually, a pull-in effect results, i.e., the timing variation is less than zero, because the inductive crosstalk effect is stronger. It should be appreciated that the inductive crosstalk and $V_{CCPD}$ PDN noise cause a peak in FIG. 2C and results in a sag in FIG. 2D, as similarly discussed with reference to FIGS. 2A and 2B, respectively.

Figure 5:
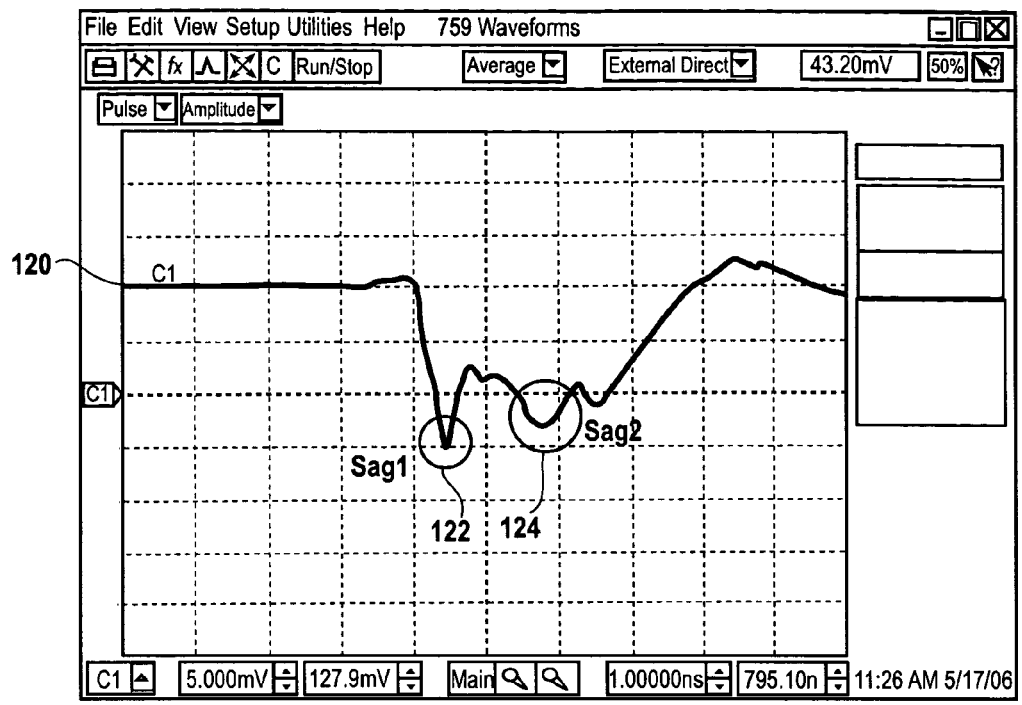
FIG. 5 is a simplified schematic diagram illustrating a screenshot for a typical victim of waveform in a quiet high scenario where the victim pin is held at a logic high level in accordance with one embodiment of the invention.
Figure 6:
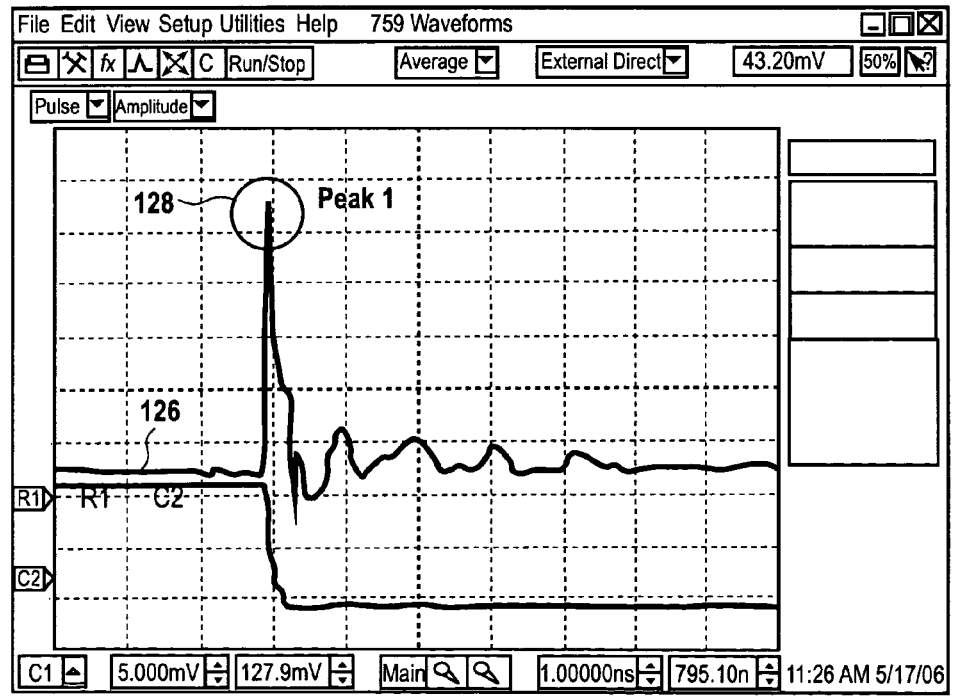
FIG. 6 is a simplified schematic diagram illustrating a screenshot for a typical victim waveform and a quiet low scenario where the victim pin is held at a logical low level in accordance with one embodiment of the invention.

The I/O timing variation at a SSN condition is linearly proportional to the amplitude of inductive crosstalk and PDN noise. Therefore, a generic analytical equation (1) is derived and extracted from bench measurements to predict the worst timing variation, which is usually due to the inductive crosstalk and $V_{CCPD}$ PDN noise.

$$\Delta t = k_1 XTALK + k_2 N_{sb} + k_3 N_{ab}, \quad (1)$$

where $k_1$, $k_2$, and $k_3$ are constants, and extracted from measurement results;

XTALK is the amplitude of inductive crosstalk (Sag 1 of "quiet-high" scenario illustrated in FIG. 5 or Peak 1 of "quiet-low" scenario in FIG. 6);

$N_{sb}$ is the number of aggressors in the same I/O bank as the victim pin;

$N_{ab}$ is the number of aggressors in I/O banks adjacent to the one of victim pin FIG. 5 is a simplified schematic diagram illustrating a screenshot for a typical victim of waveform in a quiet high scenario where the victim pin is held at a logical high level in accordance with one embodiment of the invention. Waveform 120 is illustrated as having Sag 1 in region 122 and Sag 2 in region 124. Sag 1 is mainly due to the inductive crosstalk, while Sag 2 is due to the $V_{CCPD}$ PDN noise. FIG. 6 is a simplified schematic diagram illustrating a screenshot for a typical victim waveform and a quiet low scenario where the victim pin is held at a logical low level in accordance with one embodiment of the invention. Waveform 126 is illustrated as having a peak in region 128. It should be appreciated that the peak in region 128 is mainly due to the inductive crosstalk.

A complete set of exemplary equations for FIGS. 2A through 2D is illustrated in Table 1. It should be appreciated that the coefficient of inductive crosstalk $k_1$ for the example represented by FIG. 2A is equal to the opposite of $k_1$ in the example represented by FIG. 2D, because the victim edge transitions are opposite and aggressor transitions are identical in corresponding exemplary representations. The absolute value of $k_1$ in FIGS. 2A and 2D is different from that in FIGS. 2B and 2C, respectively, since the transition rates of rising and falling edges are different. Items $k_2N_{sb}$ and $k_3N_{ab}$ in equations (2), (3), (4), and (5) of Table 1 represent contributions of $V_{CCPD}$ PDN noise on timing variation. The values of $k_2$ and $k_3$ remain the same across cases, since the $V_{CCPD}$ PDN noise is only dependent on the number of pre-drivers as discussed further below.

It should be appreciated that equation (1) can be further generalized to predict contribution of $V_{CCIO}$ PDN noise on timing variation, such as Peak B in FIG. 3. This generalization is provided as:

$$\Delta t = k_1 PDN_{VCCIO} + k_2 N_{sb} + k_3 N_{ab}, \quad (6)$$

where $PDN_{VCCIO}$ is the amplitude of $V_{CCIO}$ PDN noise (Sag 2 of "quiet-high" in FIG. 5).

The victim edge information is not taken account in equation (1). The discrepancy between measured timing results and predictions by using equation (1) might be significant when the victim I/O pin uses a slow slew rate or weak drive strength. Therefore, the algorithm is upgraded, and the equation is developed to overcome this weakness as:

$$\Delta t = \Delta t_1(XTALK) + \Delta t_2(V_{CCPD}) + \Delta t_3(V_{CCIO}) \quad (7)$$
$$= \Delta t_1(XTALK) + k_{VCCPD}(\text{number of aggressors}), +$$
$$k_{VCCIO}(\text{number of aggressors})$$

TABLE 1

| Case | Phase Relationship | Equation | |
|---|---|---|---|
| Case A | 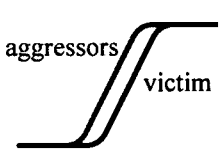 | $\Delta t(ps) = k_1 XTALK + k_2 N_{sb} + k_3 N_{ab}$<br>XTALK is the amplitude of inductive crosstalk<br><br>$= 0.2482 * XTALK(mV) + 0.59 * N_{sb} + 0.2431 * N_{ab}$ | (2) |
| Case B | 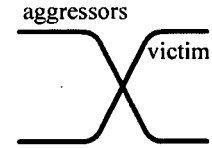 | $\Delta t(ps) = k_1 XTALK + k_2 N_{sb} + k_3 N_{ab}$<br>$N_{sb}$ is the number of aggressor pins in the same bank as the victim pin<br><br>$= -0.2196 * XTALK(mV) + 0.59 * N_{sb} + 0.2431 * N_{ab}$ | (3) |
| Case C | 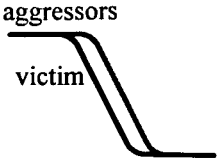 | $\Delta t(ps) = k_1 XTALK + k_2 N_{sb} + k_3 N_{ab}$<br>$N_{ab}$ is the number of aggressor pins in the adjacent banks to the victim pin's bank<br><br>$= 0.2196 * XTALK(mV) + 0.59 * N_{sb} + 0.2431 * N_{ab}$ | (4) |
| Case D | 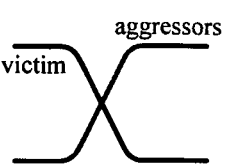 | $\Delta t(ps) = k_1 XTALK + k_2 N_{sb} + k_3 N_{ab}$<br><br>$= -0.2482 * XTALK(mV) + 0.59 * N_{sb} + 0.2431 * N_{ab}$ | (5) | where $\Delta t_1(XTALK)$ is an implicit timing variation expression. Its value is dependent on both inductive crosstalk amplitude and victim IO edge characteristic;

$k_{VCCPD}$ is a constant coefficient, and extracted from measurements to quantify the timing contribution from $V_{CCPD}$ PDN noise; and, $k_{VCCIO}$ is a constant coefficient, and extracted from measurements to quantify the timing contribution from $V_{CCIO}$ PDN noise.

Figure 7:
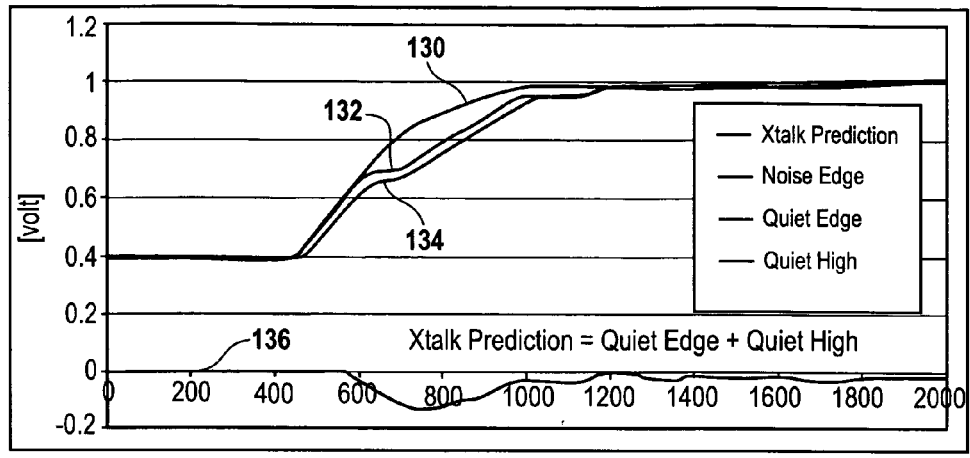
FIG. 7 is a simplified schematic diagram illustrating a waveform superimposition technique for extracting a crosstalk effect in accordance with one embodiment of the invention.

FIG. 7 is a simplified schematic diagram illustrating a waveform superimposition technique for extracting a crosstalk effect in accordance with one embodiment of the invention. In FIG. 7 line 136 represents the crosstalk effect. It should be appreciated that the data represented by line 136 may be obtained from any of the above-referenced patent applications incorporated herein by reference. Line 130 represents the measured quiet victim edge, while line 134 represents the measured victim edge under noisy conditions. Line 132 illustrates the crosstalk prediction that represents the timing variation due to the crosstalk. It should be appreciated that line 132 is generated by adding the quiet high waveform of line 136 to the quiet victim edge waveform represented by line 130. As can be seen in FIG. 7, there is a difference between line 132 and the measured victim edge under noisy conditions of line 134. This difference is caused by the pre-driver PDN effect and is considered through the embodiments described below to provide a more accurate prediction.

Figure 8:
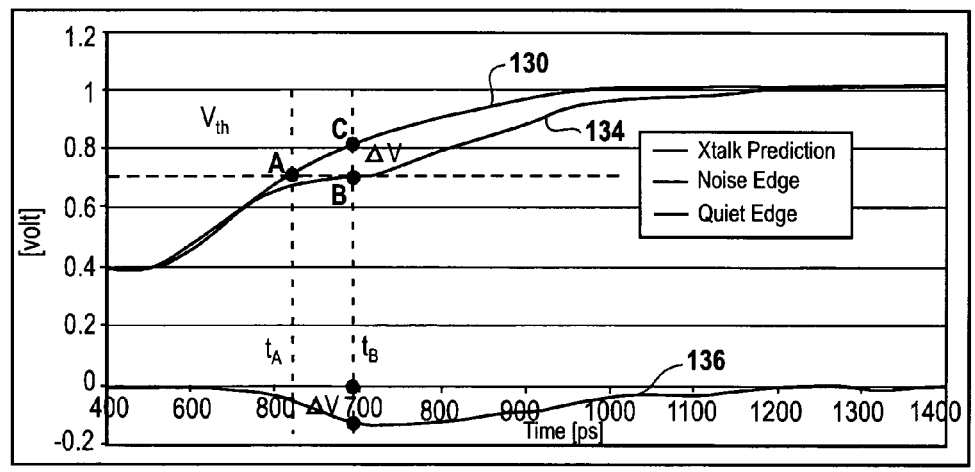
FIG. 8 is a simplified schematic diagram illustrating a technique for predicting a crosstalk effect on a transitioning edge of a waveform that considers the pre-driver PDN impact in accordance with one embodiment of the invention.
Figure 9A:
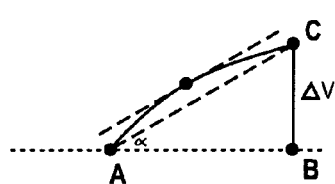
FIGS. 9A and 9B and are simplified schematic diagrams illustrating a technique for determining the timing variation based on the geometry of the difference between the quiet victim edge waveform and a predicted crosstalk waveform in accordance with one embodiment of the invention.
Figure 9B:
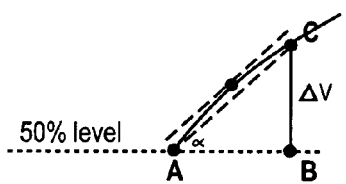

FIG. 8 is a simplified schematic diagram illustrating a technique for predicting a crosstalk effect on a transitioning edge of a waveform that considers the pre-driver PDN impact in accordance with one embodiment of the invention. FIGS. 9A and 9B and are simplified schematic diagrams illustrating a technique for determining the timing variation based on the geometry of the difference between the quiet victim edge waveform 130 and a predicted crosstalk waveform 134 in accordance with one embodiment of the invention. The technique for calculating the timing variation may be summarized as follows:

Obtain arbitrary $\Delta V$@time $t_B$ from "quiet-high" curve (see $\Delta V$ along line 140 of FIG. 9);

Identify Point B at "Xtalk Prediction" curve ($V_B - V_c = \Delta V$) (line 140 of FIG. 8);

Determine threshold voltage level Vth (line 142 of FIG. 8) at which timing variation is to be predicted, Identify Point A at "quiet edge" curve (see intersection of line 140 and line 142 of FIG. 8), Calculate $\Delta t_1(XTALK) = t_B - t_A = \Delta V/\tan(\alpha)$, where $\alpha$ is the slope of the "quiet edge" at point A (see FIGS. 9A and 9B where the short segment between points A and C is assumed to be linear)

Figure 10:
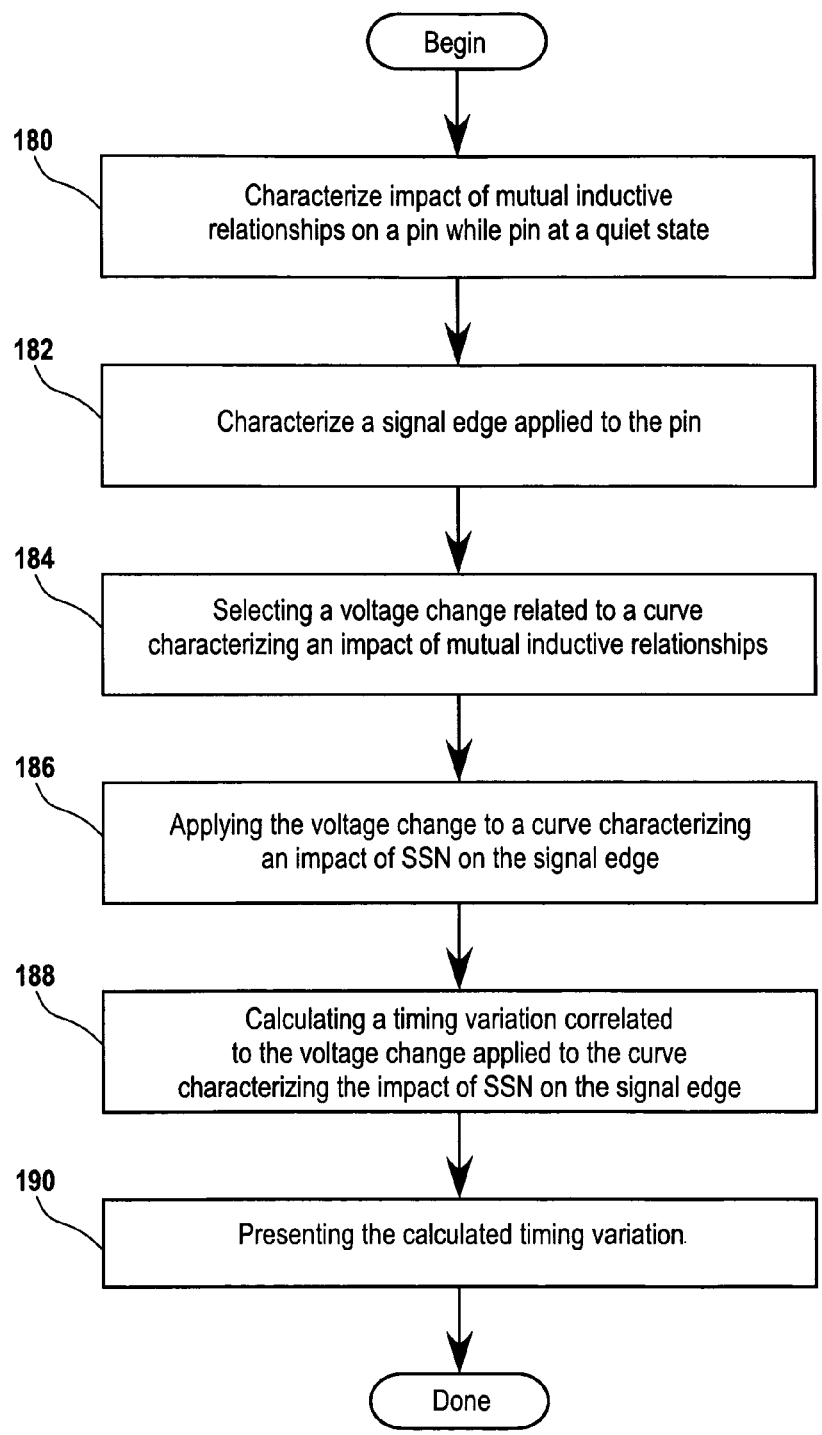
FIG. 10 is a flow chart diagram illustrating the method operations for determining a timing variation foreign edge of a transitioning waveform while considering SSN impact in accordance with one embodiment of the invention.

FIG. 10 is a flow chart diagram illustrating the method operations for determining a timing variation foreign edge of a transitioning waveform while considering SSN impact in accordance with one embodiment of the invention. The method initiates with operation 180 where an impact of mutual inductive relationships on a pin while the pin is at a quiet state is characterized. It should be appreciated that this characterization yields the quiet victim edge illustrated in FIGS. 7 and 8 in accordance with one exemplary embodiment. This characterization can be pre-processed and stored in one embodiment, or calculated in real time in another embodiment. The method then advances to operation 182 where a signal edge applied to the pin is characterized. It should be appreciated that the characterization of the signal edge may specify that the victim edge is fast, slow, or some other suitable speed characterization of the signal edge. The method then proceeds to operation 184 where a voltage change related to a curve characterizing the impact of mutual inductive relationships is identified. Here, the voltage change identified for the quiet high curve at a particular time with reference to FIGS. 7 and 8 is provided. As mentioned above, the curve characterizing the impact of mutual inductive relationships may be generated as discussed in U.S. application Ser. Nos. 12/034,400, 12/137,407, 12/208,190, and 11/877, 072, which have been incorporated by reference. The method then advances to operation 186 where the timing variation correlated to the identified voltage change is calculated. In one embodiment, the timing variation may be calculated through the geometry and associated equations illustrated with reference to FIGS. 9A and 9B, as well as the technique described above with reference to FIG. 8. It should be appreciated that a in FIGS. 9A and 9B represents the slew rate for the victim edge in one embodiment. It should be further appreciated that the vertical amplitude for the voltage sag is correlated to a horizontal timing variation through the embodiments listed above.

Figure 11:
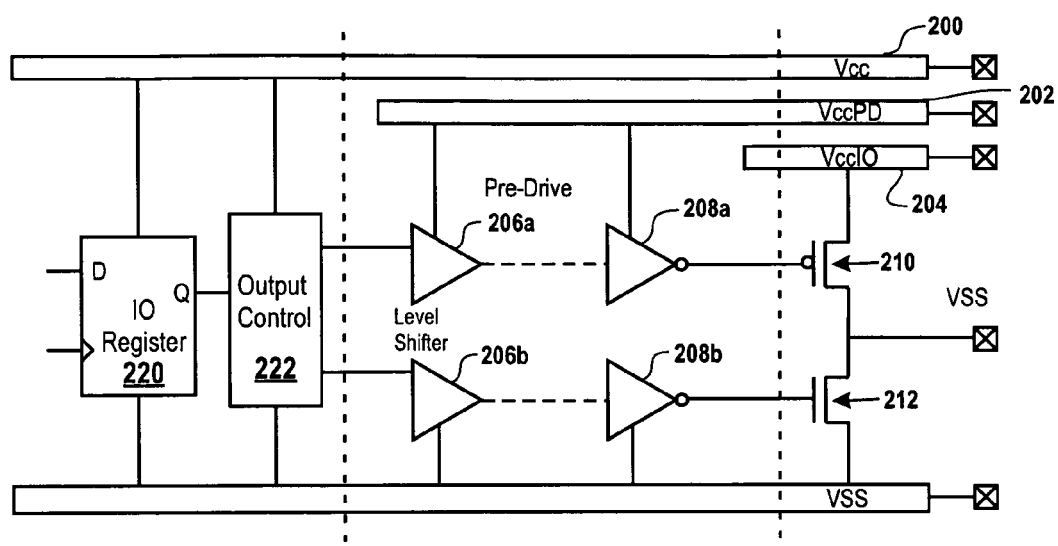
FIG. 11 is a simplified schematic diagram illustrating an exemplary input/output buffer circuit design where the techniques for determining a timing variation described herein may be utilized in accordance with one embodiment of the invention.
Figure 12A:
FIGS. 12A-D are simplified schematic diagrams illustrating the measured timing variation data due to pre-driver voltage noise for IO standard stub series terminated logic for 1.8 volts (SSTL18) with 6 mA current strength.
Figure 12B:
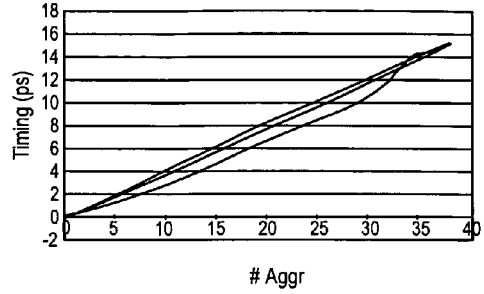
Figure 12C:
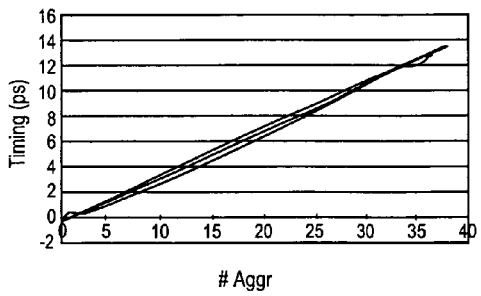
Figure 12D:
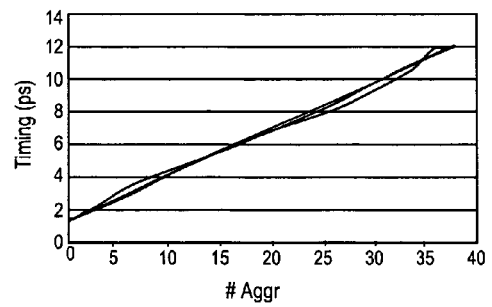

FIG. 11 is a simplified schematic diagram illustrating an exemplary input/output buffer circuit design where the techniques for determining a timing variation described herein may be utilized in accordance with one embodiment of the invention. The power for I/O register 220 and output control module 222 is provided through $V_{CC}$ 200. $V_{CCPD}$ 202 powers the pre-driver circuits, which include buffers 206a, 206b, 208a, and 208b. $V_{CCIO}$ 204 powers the I/O buffers. It should be appreciated that NMOS 212 and PMOS 210 buffers are turned off to exclude any timing variation due to $V_{CCIO}$ PDN noise. Consequently, the victim signal timing should be impacted solely by pre-driver voltage fluctuations in one embodiment.

FIGS. 12A-D are simplified schematic diagrams illustrating the measured timing variation data due to pre-driver voltage noise for IO standard SSTL18 with 6 mA current strength. From the measured data it was found that:

$$\Delta t_2(VCCPD) \propto k_{VCCPD} * (\text{number of aggressors})$$

Taking an average number from FIGS. 12A-D, $k_{VCCPD}$ is calculated to be 0.35. Therefore, $$\Delta t_2(VCCPD) = 0.35 * (\text{number of aggressors})$$

Additional data also revealed that the measured value for $k_{VCCPD}$ (0.35) is relatively consistent across all IO standards.

In summary, the above-described invention provides for an accurate analysis as the methodology is based on the I/O SSN mechanisms such as, cross talk, Power Distribution Network noise, PDN resonance, reflection, etc. Quick analysis is feasible since the methodology breaks down and analyzes the problem in small blocks. This I/O SSN analysis tool also produces both voltage amplitude and timing information. The embodiments disclose a linear relationship of I/O timing variation at simultaneous switching noise (SSN) conditions to SSN amplitude. Specifically, the push-out or pull-in timing effect is primarily determined by inductive crosstalk and power distribution network (PDN) noise of output drivers and pre-drivers. Moreover, given information of SSN amplitude, an analytical equation is provided to anticipate the worst timing variation. The prediction results are correlated well to bench hardware measurements. It should be appreciated that in one specific example the SSN could tighten timing margin and degrade parallel I/O performance in DDR memory applications. Thus, it is important to have accurate predictions of timing variation at an early design phase. Existing SSN tools suffer either from inaccuracy or inefficiency. The embodiments described herein overcome these deficiencies. The analytical equation and embodiments described above can provide an instant, accurate prediction of I/O timing variation at SSN conditions. The equation can be widely used for timing prediction and integrated with existing SSN tools, as long as the tools can provide SSN amplitude prediction for the embodiments described herein.

It should be appreciated that while some of the examples described above refer to PLDs, this is not meant to be limiting as the embodiments may be applied to any integrated circuit to optimize pin placement and enhance signal and power integrity, as well as ensure timing requirements are met. In addition, the method operation described above may be stored in memory of a computing device and executed by a processor to produce the functionality described herein. The results, e.g., the timing variation details, may be displayed or presented through a display of the computing device so that a circuit design can be modified to ensure proper timing margins are met for SSN conditions. The embodiments may be incorporated into any electronic design automation (EDA) software as an add-on module in one embodiment. One exemplary EDA tool is the QUARTUS™ EDA tool owned by the assignee.

The technique described herein may be applied to a design of an integrated circuit, or an actual integrated circuit, such as a microprocessor or programmable logic device (PLD). In one embodiment, the microprocessor or PLD described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A computer implemented method for determining a timing variation for an edge of a transitioning waveform while considering simultaneous switching noise (SSN) conditions, comprising:
   determining a phase relationship between signals of a victim pin and an aggressor pin;
   calculating an amplitude value for a SSN condition at a phase offset corresponding to the phase relationship;
   adjusting the amplitude value with a pre-calculated constant, the pre-calculated constant derived from physical measurements;
   combining the adjusted amplitude value with an impact from additional aggressor pins within a bank of pins having the aggressor pin to determine the timing variation; and
   presenting the timing variation for the edge of the transitioning waveform.

2. The method of claim 1, further comprising:
   combining output of the adjusted amplitude value and the impact from additional aggressor pins within the bank of pins with an impact from additional aggressor pins within a bank of pins adjacent to the bank of pins to further determine the timing variation.

3. The method of claim 1 wherein the amplitude value is correlated to an inductive crosstalk and wherein each method operation is executed through a processor.

4. The method of claim 1, wherein the amplitude value is correlated to a power distribution network (PDN) noise for Input/Output (I/O) pins.

5. The method of claim 1, wherein calculating the amplitude value includes determining a timing impact on a signal edge of a victim I/O pin relative to a quiet state for the victim I/O pin.

6. The method of claim 5, wherein determining a timing impact includes identifying a slope at a point on a curve representing the quiet state, the point being associated with a voltage at which the timing variation occurs.

7. The method of claim 6, wherein the curve representing the quiet state is predetermined and stored for use with the computer implemented method.

8. A computer implemented method for determining a timing variation for an edge of a waveform under simultaneous switching noise (SSN) conditions, comprising:
   characterizing an impact of mutual inductive relationships on a pin while the pin is at a quiet state;
   characterizing a signal edge applied to the pin;
   selecting a voltage change related to a curve characterizing the impact of mutual inductive relationships;
   applying the voltage change to a curve characterizing an impact of SSN on the signal edge;
   calculating a timing variation correlated to the voltage change applied to the curve characterizing the impact of SSN on the signal edge; and
   presenting the calculated timing variation.

9. The method of claim 8, wherein the characterizing the impact of mutual inductive relationships on the pin includes,
   capturing mutual inductive relationships between pins of the integrated circuit into a matrix, the capturing based on physical measurements; and
   storing the matrix.

10. The method of claim 8, wherein the impact of SSN on the signal edge is generated by accessing data representing the signal edge at a quiet state; and wherein the method includes determining a slope of a curve representing the data at a point on the curve correlated with the voltage change.

11. The method of claim 10, further comprising:
    calculating the timing variation from the slope and the voltage change.

12. The method of claim 8, wherein the characterizing of the signal edge applied to the pin is performed under quiet conditions.

13. The method of claim 12, wherein the characterizing of the signal edge is based on simulated results.

14. The method of claim 8, wherein each method operation is a program instruction on a computer readable storage medium.

15. The method of claim 8, wherein the signal edge of a waveform applied to the pin is out of phase with waveforms applied to aggressor pins.

16. The method of claim 8, wherein the timing variation includes a sag impact due to noise on a pre-drive voltage supply.

17. The method of claim 16, wherein the pre-drive voltage supply supplies a voltage for pre-drive buffers supplying a voltage to a gate of a transistor in communication with an I/O pin for a design of an integrated circuit.

18. A non-transitory computer readable storage medium having program instructions for determining a timing variation for an edge of a waveform under simultaneous switching noise (SSN) conditions, comprising:
  program instructions for selecting a voltage change related to a curve characterizing an impact of mutual inductive relationships between a victim pin and aggressor pins;
  program instructions for applying the voltage change to a curve characterizing an impact of SSN on the signal edge applied to the victim pin under quiet conditions; and
  program instructions for calculating a timing variation correlated to the voltage change applied to the curve characterizing the impact of SSN on the signal edge.

19. The computer readable storage medium of claim 18, further comprising:
  program instructions for determining a slope of the curve characterizing an impact of SSN on the signal edge at a point on the curve correlated with the voltage change.

20. The computer readable storage medium of claim 18, further comprising:
  program instructions for accessing data characterizing the impact of mutual inductive relationships between the victim pin and aggressor pins; and
  program instructions for accessing data characterizing the impact of SSN on the signal edge.

21. The computer readable storage medium of claim 18, wherein the program instructions for calculating a timing variation consider a sag impact due to noise on a pre-drive voltage supply.

* * * * *